(12) United States Patent
Jacquin et al.

(10) Patent No.: US 7,958,444 B2
(45) Date of Patent: Jun. 7, 2011

(54) VISUALIZING DOCUMENT ANNOTATIONS IN THE CONTEXT OF THE SOURCE DOCUMENT

(75) Inventors: Thierry Jacquin, Gières (FR); Jean-Pierre Chanod, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 943 days.

(21) Appl. No.: 11/453,609

(22) Filed: Jun. 15, 2006

(65) Prior Publication Data

US 2007/0294614 A1 Dec. 20, 2007

(51) Int. Cl.
 *G06F 17/21* (2006.01)
(52) U.S. Cl. ........ 715/232; 715/230; 715/231; 715/233; 715/234; 715/235
(58) Field of Classification Search .................. 715/230, 715/210, 231, 232, 233, 234, 235
See application file for complete search history.

(56) References Cited

U.S. PATENT DOCUMENTS

| | | | |
|---|---|---|---|
| 5,918,236 A | 6/1999 | Wical | |
| 6,112,201 A | 8/2000 | Wical | |
| 6,397,213 B1 | 5/2002 | Cullen | |
| 7,143,344 B2* | 11/2006 | Parker et al. | 715/236 |
| 7,234,108 B1* | 6/2007 | Madan | 715/223 |
| 7,259,753 B2* | 8/2007 | Keely et al. | 345/179 |
| 7,284,192 B2* | 10/2007 | Kashi et al. | 715/232 |
| 7,453,472 B2* | 11/2008 | Goede et al. | 345/634 |
| 7,472,341 B2* | 12/2008 | Albornoz et al. | 715/230 |
| 7,703,001 B2* | 4/2010 | Takaai et al. | 715/232 |
| 2002/0111966 A1* | 8/2002 | Fukuda et al. | 707/513 |
| 2003/0135825 A1* | 7/2003 | Gertner et al. | 715/513 |
| 2003/0158843 A1 | 8/2003 | Boguraev | |
| 2004/0034652 A1* | 2/2004 | Hofmann et al. | 707/102 |
| 2004/0172594 A1* | 9/2004 | Jones et al. | 715/512 |
| 2005/0235202 A1* | 10/2005 | Chen et al. | 715/523 |

FOREIGN PATENT DOCUMENTS

WO WO 00/77690 12/2000

OTHER PUBLICATIONS

Semantic annotation, indexing, and retrieval, Web Semantics: Science, Services and Agents on the World Wide Web, vol. 2, Issue 1, Dec. 1, 2004, p. 49-79.*
Web Semantics Science, Services and Agents on the WWW; vol. 2, Issue 1; Dec. 2004; pp. 49-79 Elsevier Science Publishers.*

(Continued)

*Primary Examiner* — Stephen S Hong
*Assistant Examiner* — Christopher Bryant
(74) *Attorney, Agent, or Firm* — Fay Sharpe LLP

(57) ABSTRACT

In a document annotator (8), a document converter (12) is configured to convert a source document (10) with a layout to a deterministic format (14, 64) including content and layout metadata. At least one annotation pipeline (20, 22) is configured to generate document annotations respective to received content. A merger (36, 46) is configured to associate the generated document annotations with positional tags based on the layout metadata, which locate the document annotations in the layout. A document visualizer (58) is configured to render at least some content of the deterministic format and one or more selected annotations (60) in substantial conformance with the layout based on the layout metadata and the positional tags associated with the selected one or more annotations (60).

21 Claims, 2 Drawing Sheets

OTHER PUBLICATIONS

Lipkin et al., "XSL Transformations (XXLT). Version 1.0," W3C®, pp. 1-98, at http://www.w3.org/TR/19999/REC-sxlt-19991116, (1999).

"About SVG 2d Graphics in XML," Scalable Vector Graphics, pp. 1-3, at http://www.w3.org/Graphics/SVG/About.html, last visited May 10, 2006.

Champin, Pierre-Antoine, "RDF Tutorial," pp. 1-14, (2001).

"PDF2HTML V1.5 user manual," pp. 1-5, at http://www.convertzone.com/pdftohtm/help.htm, last visited May 9, 2006.

Hobbs et al., "FASTUS: A Cascaded Finite-State Transducer for . . . ," MIT Press, Cambridge, MA (1996).

"T-Rex," at http://tyne.shef.ac.uk/t-rex/, 1 page, last visited on Apr. 25, 2006.

Ciravegna, Fabio, "Amilcare," University of Sheffield, at http://www.dcs.shef.ac.uk/~fabio/, 2004.

"An Open, Industrial-Strength Platform . . . ," UIMA at http://www.research.ibm.com/UIMA/IUMATopPage.html, last visited on Apr. 25, 2006.

U.S. Appl. No. 11/296,396, filed Dec. 2005, Salgado et al.

U.S. Appl. No. 11/316,771, filed Dec. 2005, Chidlovskii et al.

Cunningham et al., "Developing Language Processing Components with GATE Version 3 (a User Guide)," the University of Sheffield, pp. 1-236, at http://www.gate.ac.uk/sale/tao/, (2001-2006).

Ciravegna, Fabio, "Adaptive Information Extraction From Text by Rule Induction and Generalisation," Proceedings of $17^{th}$ International Joint Conference on Artificial Intelligence (IJCAI 2001), Seattle, WA, Aug. 2001.

Chanod et al., "From Legacy Documents to XML: A Conversion Framework," $9^{th}$ European Conference on Research and advanced Technology for Digital Libraries (ECOL 2005), Vienna, Austria, Sep. 18-23, 2005.

Kenter et al., "Using GATE as an Annotation Tool," pp. 1-11, Jan. 28, 2005.

"Adobe Portable Document Format," Adobe Systems Incorporated, at http://www.adobe.com/products/acrobat/adobepdf.html, 2 pp., 2006.

"Adobe Acrobat Capture 3," Adobe Systems Incorporated, at http://www.adobe.com/products/acrcapture/main.html, 2 pp., 2006.

"Google-style keyword highllighting using htaccess and PHP," at http://66.102.9.104/search?q=cache:1qTexz0FzhwJ:www.ilovejackdaniels.com/php/goggle-style..., pp. 1-5, last visited on Apr. 26, 2006.

* cited by examiner

VISUALIZING DOCUMENT ANNOTATIONS IN THE CONTEXT OF THE SOURCE DOCUMENT

BACKGROUND

The following relates to the information processing arts. It particularly relates to annotation, analysis, cataloging, and retrieval of documents based on semantic content, and is described with particular reference thereto. However, the following relates more generally to annotation, analysis, cataloging, and retrieval of documents on other bases.

There is substantial interest in cataloging documents based on semantic content, such as author name, document title, subject matter, or so forth. The source document may be in any of various formats, such as portable document format (PDF), hypertext markup language (HTML), a native application format such as a word processor format or a spreadsheet format, or so forth. The semantic analysis is typically performed by a semantic analysis pipeline which may include, for example, tokenizer, parser, and semantic content analysis components, typically operating in conjunction with a grammar, lexicon, ontology, or other external references or resources.

To perform semantic analysis, the original document is imported into the semantic analysis pipeline. Typically, this entails extracting the text content of the document, and inputting the extracted text content into the semantic analysis pipeline. The pipeline processes the textual content to generate document annotations that are then used in cataloging, indexing, labeling, or otherwise organizing the document or a collection of documents. Later, a user identifies and retrieves the document on the basis of one or more semantic annotations which attract the user's interest.

A problem arises, however, when the user wishes to visualize the document. There is typically no connection or linkage between an annotation and the position in the source document layout to which the annotation applies. Creation of such a linkage is difficult, since the native layout of the source document is typically distinct from and more complex than the text-based input that is processed by the semantic annotator. Accordingly, it is difficult or impossible to associate semantic annotations with appropriate positions in the visualized layout of the original source document.

One approach is to construct links during the retrieval phase based on occurrences in the document of a keyword associated with the semantic annotation. For example, if the semantic annotation identifies the author of the document, this annotation can be associated with occurrences of the author's name in the document. However, such keyword-based approaches are unsatisfactory in certain respects. A given keyword may occur multiple times in the document, while the semantic annotation may be associated with only one or a sub-set of those keyword occurrences. For example, the author annotation may be properly associated with the occurrence of the author's name at the top of the document, but the keyword-based association may also improperly associate the author annotation with other occurrences of the author's name, such as in the text body or in the references (if the author cites his or her own prior work, for example). In such a case, the annotation is not unambiguously associated with the correct portion of or location in the source document.

On the other hand, the semantic annotation itself may have multiple keywords, again creating ambiguity as to which keyword occurrences in the document should be associated with the semantic annotation. Still further, a particular semantic annotation may not have a readily associated keyword. For example, an article on global oil reserves may have the semantic annotation "Subject: Energy Conservation" but the terms "energy" and "conservation" may not occur anywhere in the article.

Other types of annotation may be used, with similar difficulties typically arising during visualization. An example of another type of annotation is image classification. One or more images are extracted from the source document, and the extracted images are analyzed by an image classifier which outputs image classification annotations. The user then retrieves a document based on its containing an image classification of interest. Again, there is typically no connection or linkage between the annotation and the position in the source document layout to which the annotation applies. Moreover, construction of keyword-based annotation linkages for image classification annotations during visualization is typically not feasible.

CROSS REFERENCE TO RELATED PATENTS AND APPLICATIONS

The following related U.S. patent applications that commonly owned with the present application are each incorporated herein by reference:

Salgado et al., U.S. application Ser. No. 11/296,396 filed Dec. 8, 2005, entitled "Method and System For Color Highlighting Of Text" is incorporated herein by reference in its entirety. This application relates at least to converting PostScript files to text while retaining layout information, performing natural language processing to identify selected sub-strings, and identifying positions of the selected sub-strings as bounded highlighting boxes that are re-injected into the source PostScript before printing.

Chidlovskii et al., U.S. application Ser. No. 11/316,771 filed Dec. 23, 2005, entitled "Interactive Learning-Based Document Annotation" is incorporated herein by reference in its entirety. This application relates at least to interactive machine learning-based document annotation.

BRIEF DESCRIPTION

According to aspects illustrated herein, a document annotator is disclosed. A document converter is configured to convert a source document with a layout to a deterministic format including content and layout metadata. At least one annotation pipeline is configured to generate document annotations respective to received content. A merger is configured to associate the generated document annotations with positional tags based on the layout metadata. The positional tags locate the document annotations in the layout. A document visualizer is configured to render at least some content of the deterministic format and one or more selected annotations in substantial conformance with the layout based on the layout metadata and the positional tags associated with the selected one or more annotations.

According to aspects illustrated herein, a document visualization method is disclosed. A selection is received of a document annotation having an associated source document and an associated positional tag. Content of the associated source document and the document annotation are rendered in accordance with content and layout metadata representative of the associated source document and the positional tag associated with the document annotation.

According to aspects illustrated herein, a document annotation method is disclosed. An initial representation of a source document is generated. The initial representation includes initial content of the source document and initial layout metadata indicative of layout of said content in the source document. At least some of the initial content of the source document is processed to generate document annotations. Positional tags of the initial layout metadata are assigned to the generated document annotations to locate the document annotations respective to the initial layout metadata. At least the document annotations and their assigned positional tags are stored.

DETAILED DESCRIPTION

Figure 1:
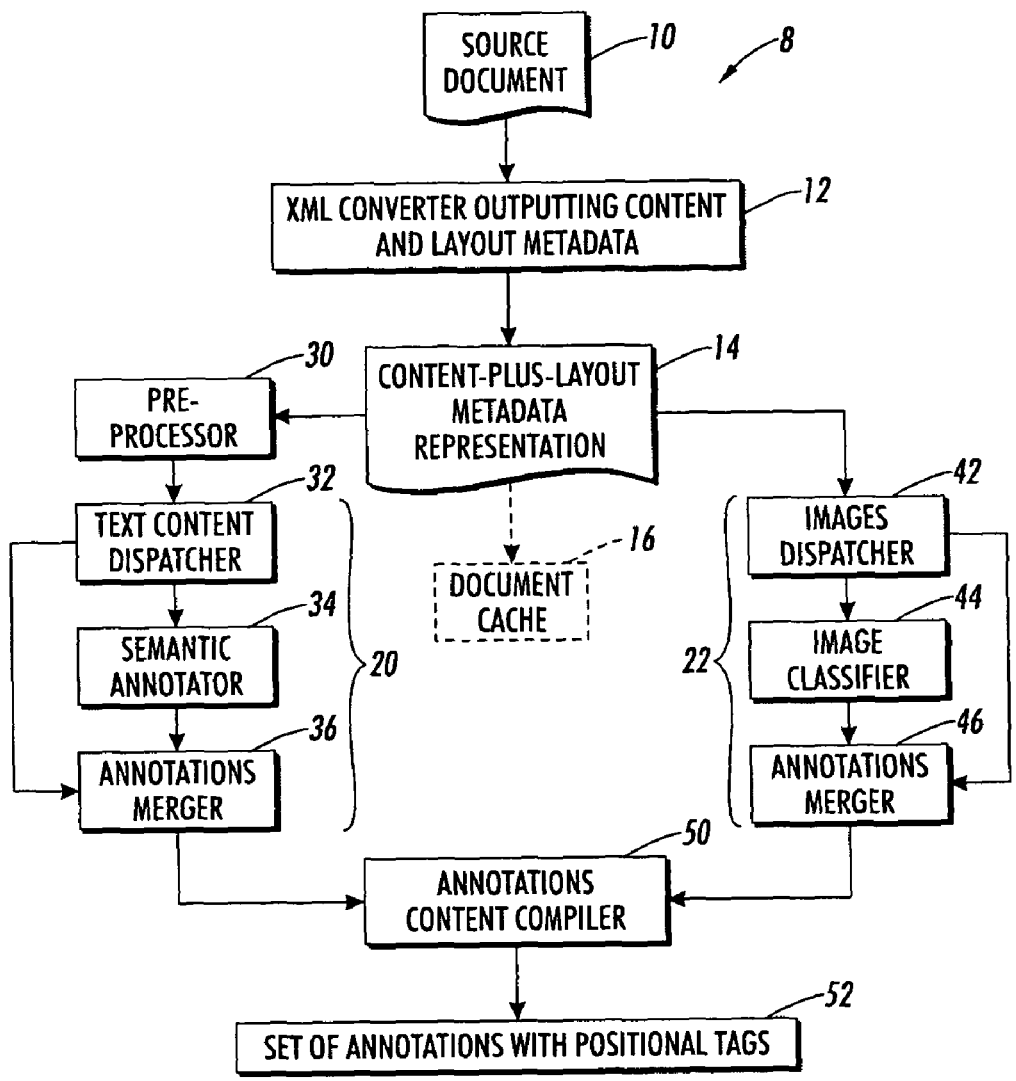
FIG. 1 diagrammatically shows a system for annotating documents.

With reference to FIG. 1, an annotation system 8 receives a source document 10 for annotation. The source document 10 has a layout that is typically embedded or integral with the source document 10. For example, the source document may be a hypertext markup language (HTML) document including layout tags specifying layout features such as: image sizes or positions; textual font types, sizes, and attributes such as bold, underscore, or so forth; paragraph alignment (e.g., left-aligned, right-aligned, centered, justified, or so forth); line spacing; hyperlinks; tables; frames; and so forth. As another example, the source document 10 may be in a portable document format (PDF). The PDF document may include embedded or integral layout features such as: font size, type, or attributes; line spacing; hyperlinks; page-specific features such as page identification, column identification, and so forth. As another example, the source document 10 may be in a native word processing application format, such as a Microsoft™ Word document format. The word processing application format may specify layout features such as: font size, type, or attributes; line spacing; hyperlinks; page-specific features such as columns or hard page breaks; logical or semantic organizational features such as a table of contents, index, or so forth. As another example, the source document 10 may be an extensible markup language (XML) document, and may include layout features such as: font size, type, or attributes; hyperlinks; a logical or semantic organizational schema; or so forth. The content of the source document 10 may include textual content, graphical content such as images, audio content, audiovisual content, or so forth.

The source document 10 is processed by a converter, such as an illustrated XML converter 12, that outputs a representation 14 of the source document 10 that separates content and layout information, the latter being stored or represented by layout metadata including positional tags indicating positions of paragraphs, sections, headings, or other components in the document. The representation 14 of the source document 10 includes the content and layout metadata that is sufficient for a rendering program to render the content in a layout that substantially conforms with the layout of the source document 10. The converter 12 is selected or constructed to process a range of formats that are intended to be annotated, such as HTML, PDF, and word processing application formats. In the following examples, the XML converter 12 is used, which outputs the entry level tagged document in an XML format. However, other types of structured or tagged formats that separate or distinguish content and layout information may also be used, such as standard generalized markup language (SGML) or HTML.

The conversion of the original source document 10 to the content-plus-layout metadata representation 14 optionally includes various processing steps, depending on the format of the source document 10 (e.g., PDF, or HTML, or so forth), a priori assumed regularities or features in the source documents being annotated (e.g., in some applications it may be known a priori that all source documents are newspaper articles having certain layout commonalities). The converter 12 may employ suitable format conversion tools such as existing PDF-to-HTML converters, ad hoc collection xslt stylesheets, machine learning conversion tools, or so forth. Additional processing optionally performed by the converter 12 includes operations which exploit image extraction capabilities (for example, by aligning PDF-to-HTML bounding boxes for images with URL attributes in charge of extracting the actual image content), or clean-up operations such as removing empty nodes. In the illustrated embodiment in which the representation 14 is in XML, each layout element is suitably delineated as a node of the XML representation. Some examples of suitable layout elements include: the entire source document; a chapter of the source document; a paragraph of the source document; a section of the source document; a page of the source document; a title of the source document; a column of the source document; an image of the source document; or so forth.

The layout metadata generated by the converter 12 includes positional tags. Each positional tag is a unique identifier of a layout element. For example, each heading, each section, each paragraph, and so forth is assigned a positional tag. In the illustrated embodiment, the XML converter 12 enriches each layout element-delineating node with a unique (at document level) and persistent positional tag that identifies the position of the node in the layout of the source document 10. Such positional tags can be created, for example, by using the generate_id( ) method of existing xslt processors. In the illustrated embodiment which uses an XML output, the content-plus-layout metadata representation has a decorated structure tree format (that is, a sequence of pages embedding any number of text or image elements), having the following general structure:

```
Document(URL)
  {
  Page (Pos_Tag_ids, page-number, width, height))
    {
    (...),
    Text (Pos_Tag_ids, x, y, width, height, font, font-size, ..., value),
    (...),
    Image(Pos_Tag_ids, x, y, width, height, URL) ,
    (...)
    },
  (...)
  }
``` where each Pos_Tag_ids is an attribute-value pair storing the unique and persistent positional tag of the corresponding node. The URL attribute associated with the Document node is a persistent pointer to the source document 10.

The content-plus-layout metadata representation 14 contains sufficient layout metadata such that it can be rendered with a layout substantially comporting with the layout of the original source document 10. By "substantially comporting" it is to be understood that the rendering is a substantially accurate representation of the original layout, but that there may be some deviation of the rendering from the original layout of the source document 10. Such deviations may be due, for example, to the source document 10 including a layout characteristic that is not supported, or are inexactly supported, by the converter 12. For example, the converter 12 may not support certain fonts used in the original layout, or may have a more coarse spatial resolution compared with the original layout, or so forth. The positional tags of the layout metadata are used to link annotations with corresponding positions in the rendering. Thus, once an annotation is created, it is assigned or associated with the positional tag or tags of the portion or portions of the layout to which the annotation relates. During subsequent rendering the annotation can therefore be properly placed in the rendering based on the assigned or associated positional tag or tags.

The rendering will typically be performed responsive to a user locating an annotation of interest and requesting that the source document 10 be displayed. Rather than displaying the source document 10, the representation 14 is rendered. The rendering substantially comports with the layout of the original source document 10, and the positional tags assigned to the annotations enable the annotations to be properly positioned in the rendering. Accordingly, the representation 14 should be stored between the annotating and rendering phases, for example in a document cache 16 as diagrammatically shown in FIG. 1, or alternatively be efficiently regenerated at the time of rendering, for example by invoking the converter 12 to create a new instance the representation. Storing the representation 14 in the document cache 16 may be difficult or impossible or improper for some applications, due for example to storage space limitations, copyright infringement concerns, or so forth. If the regeneration approach is used, then the converter 12 should be a deterministic converter that produces the same layout metadata including the same set of positional tags each time the converter 12 is invoked respective to the source document 10.

With continuing reference to FIG. 1, the content-plus-layout metadata representation 14 is used for annotation. In FIG. 1, two example annotation pipelines 20, 22 are illustrated; however, the number of annotation pipelines can be one, two, three, four, five, or more. In FIG. 1, the annotation pipeline 20 is a semantic annotation pipeline while the annotation pipeline 22 is an image classification pipeline. However, other annotation pipelines or combinations of annotation pipelines can be used, such as one, two, three, or more semantic annotation pipelines, one, two, three, or more image classification pipelines, or so forth. Moreover, other types of annotation pipelines besides semantic and image classification pipelines can be used. For example, it is contemplated to include an audio classifier that classifies audio content, for example, by type (e.g., musical content, narrative or talking content, nature sounds, and so forth), or an audiovisual content classifier, or so forth.

Referencing the example semantic annotation pipeline 20, an optional pre-processor 30 optionally pre-processes the content-plus-layout metadata representation 14 to comport with the input format of the pipeline 20. For example, to facilitate semantic processing of textual content the pre-processor 30 may segment textual elements into paragraphs or reconstruct a sequence of textual elements according to their reading order. In order to preserve the capacity to track layout context of the content through the annotation pipeline 20, the pre-processor 30 optionally decorates the resulting second-level structure with additional or updated temporary Pos_Tag_ids. For instance, if several text nodes of the entry level representation 14 are grouped by the pre-processor 30 into a new paragraph node, then an additional Pos_Tag_ids attribute is associated by the pre-processor 30 with the new paragraph node. The pre-processor 30 suitably assigned as the value of this new Pos_Tag_ids attribute a list or other grouping of the Pos_Tag_ids values of the constituent text nodes.

The output of the pre-processor is typically the same format as the representation. In the illustrated example, the representation 14 and the output of the pre-processor 30 are both in XML format. The output of the pre-processor 30 is input to the annotation pipeline 20. The optional pre-processor is specific to the annotation pipeline, and conditions or prepares the data for the annotation pipeline. There can be as many different second level harmonization processes as they are different annotation pipelines. If the content-plus-layout metadata representation 14 is already in a suitable format for input to a particular annotation pipeline, as is the case for the example image classification pipeline 22, then the pre-processor is suitably omitted.

With continuing reference to the semantic annotation pipeline 20, the representation 14, after pre-processing by the optional pre-processor 30, is processed by a text extractor 32 that extracts text portions, such as sentences, paragraphs, sections, or so forth, for input to a semantic annotator 34. The semantic annotator 34 can employ substantially any type of semantic processing to determine or construct semantic annotations for labeling, cataloging, or otherwise annotating the received textual content. The semantic annotator 34 may, for example, include (or directly or indirectly operatively access) a tokenizer, a parser, one or more general or topic-specific semantic content analysis components, one or more grammars or lexicons, an annotation ontology, or so forth. If, for example, the semantic annotator 34 is intended to classify medical papers and publications, then the annotator 34 may utilize an ontology identifying classes of semantic annotations of potential interest such as author, title, medical keywords, medical device names, and so forth. The semantic annotator 34 may be fully autonomous, or may be interactive, involving for example the input of a human annotator, domain expert, or so forth.

The extractor 32 keeps track of the positional tags associated with the content (such as sentences, paragraphs, sections, or so forth) that it sends to the annotator 34. An annotations merger 36 receives the annotations, and assigns or associates the appropriate positional tag of the layout metadata with each annotation. In some cases, the content may be a pre-processed grouping such as the aforementioned paragraph generated by the pre-processor 30—in this case, the annotation is associated by the annotations merger 36 with a positional tag comprising the list or other grouping of Pos_Tag_ids values of the constituent text nodes, so that the paragraph annotation is properly associated with the text nodes that make up the annotated paragraph. The annotations merger 36 optionally performs other processing. For example, if the annotation employs a schema for the extracted annotations (labeled as an example herein as the ExtractedData XML schema), then the annotations merger 36 adapts the annotation into, or modifies the annotation to comport with, the ExtractedData annotations schema.

The image classification pipeline 22 operates in similar fashion. In the illustrated example, the image classification pipeline 22 operates directly on the entry-level representation 14 without pre-processing. An images extractor 42 extracts images for classification, while keeping track of the positional tags of the images sent for classification. An image classifier 34 determines an image classification for each input image. The image classification serves as the annotation of the image. The image classifier 34 can use substantially any suitable image classification approach, such as analyzing edge features, machine learning based on clustering of feature vectors, techniques employing principal components analysis (PCA), or so forth. An annotations merger 46 operates similarly to the annotations merger 36 to receive each image classification annotation and the positional tag of the corresponding image and to assign or associate the positional tag of the image with the image classification annotation.

Annotations collected within instances of the Extracted-Data schema are optionally further transformed and enriched by an annotations content compiler 50, which may for example combine the positionally tagged annotations from the pipelines 20, 22, and the resulting annotations are stored as a set of annotations 52 in accordance with a suitable format, ontology, schema, or other representation. For example, the expression of such annotations in resource description framework (RDF) format would call for a rdf:about attribute pointing to annotated resource Entry_Level_URL and Pos_Tag_Ids values. Such an architecture can be extended to any transformation or enrichment processing of the annotations, provided the stored set of annotations 52 preserves the Pos_Tag_ids and hence the ability to retrieve the document layout context of the annotation.

With continuing reference to FIG. 1, in a typical cataloging application the annotation system 8 is applied to a large number of different source documents to be cataloged. Each source document is processed by the annotation system 8 to generate a corresponding set of annotations 52 with positional tags and linked to the source document 10 by a uniform resource locator (URL) or other pointer. Alternatively, the content-plus-layout metadata representation 14 is stored in the optional document cache 16, and the corresponding set of annotations includes a URL pointing to the stored representation. In cataloging applications, such processing is typically applied to a large number of source documents such that a substantial catalog is generated. The source documents themselves may be stored on a website of the Internet, in different websites of the Internet (for example, in the case of an Internet search engine application), in data storage facilities of a corporate network, or so forth.

Figure 2:
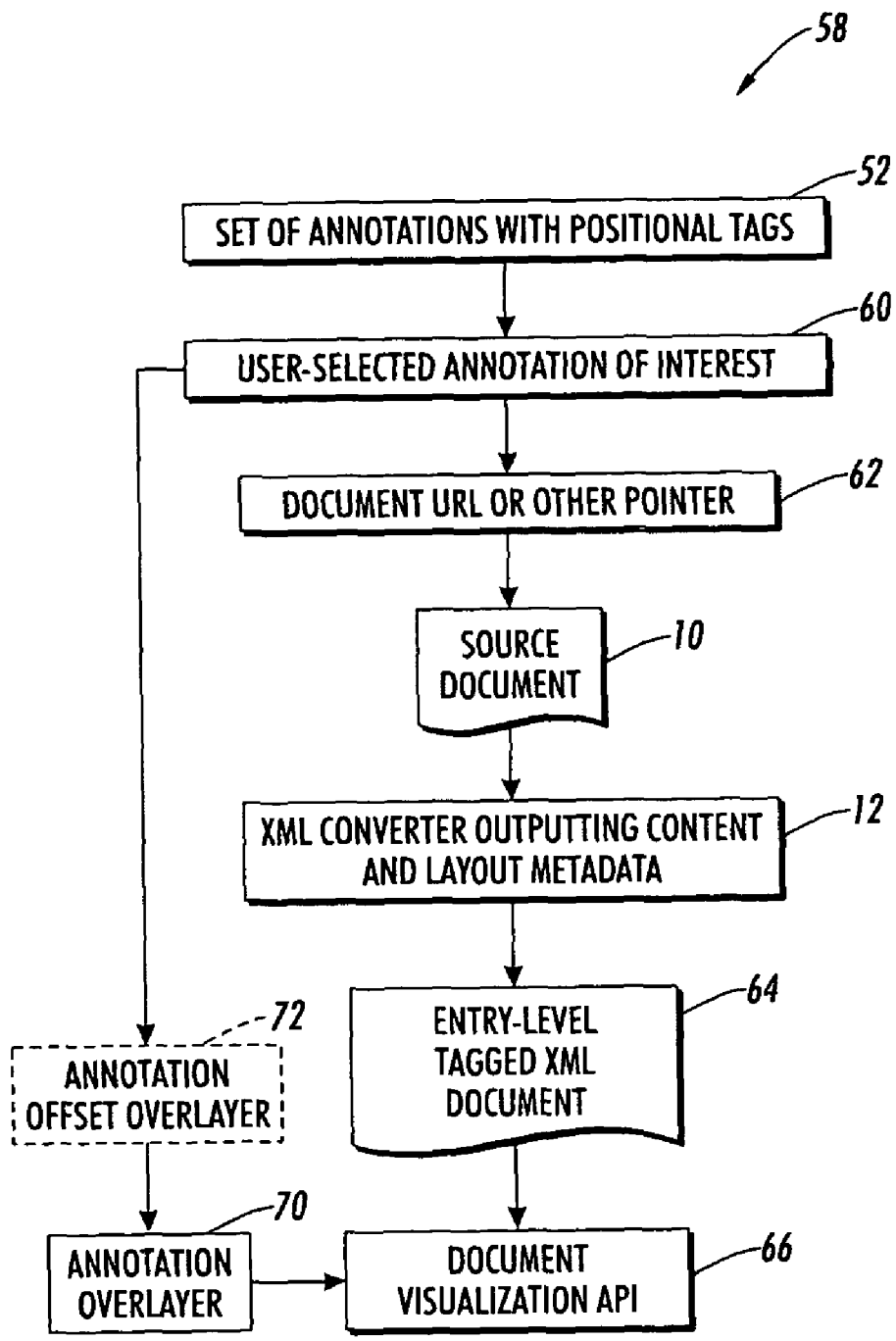
FIG. 2 diagrammatically shows a document visualization system for visualizing a document that was annotated using the system of FIG. 1.

With reference to FIG. 2, an example document visualizer 58 is invoked for viewing a document that has been annotated by the annotation system 8 of FIG. 1. The catalog of annotated documents is suitably accessed by a user to identify a document of interest based on the document annotations. In FIG. 2, it is assumed that the representation 14 of each source document is not stored (that is, the cache 16 of FIG. 1 is omitted). The user selects a document annotation of interest 60. Selection of the annotation of interest 60 may be made, for example, using a catalog search interface program operated in conjunction with a networked personal computer, handheld personal data assistant (PDA), cellular telephone, or other user interfacing device (not shown). A URL or other pointer 62 to the document 10 containing the annotation of interest 60 is also retrieved from the set of annotations 52. Since the initial representation 14 was not stored, the document visualizer 58 invokes the XML converter 12 to generate a retrieval representation 64 of the source document 10. Because the converter 12 is a deterministic converter that produces the same results for the same input each time it is invoked, it follows that the retrieval representation 64 includes retrieval content that is identical with the content of the initial representation 14, and similarly the retrieval representation 64 includes retrieval layout metadata that is identical with the layout metadata of the initial representation 14. Advantageously, since the annotations of the set of annotations 52 are linked to the layout via the positional tags (or groups of positional tags) that are generated by the converter 12, the remainder of the processing shown in FIG. 1 is suitably not re-run. (Although not shown in FIG. 2, it will be appreciated that if the cache 16 of FIG. 1 is available, then rather than regenerating the retrieval representation 64 using the converter 12, it can instead be retrieved from the cache 16.)

A document visualization application programming interface (API) 66 or other visualization component generates a rendering of the retrieval representation 64 that is suitably displayed on a monitor, laptop computer screen, or other display device (not shown), or printed by a printer (not shown), or so forth. The retrieval layout metadata is sufficient for the visualization API 66 to render the content in a layout that substantially conforms with the layout of the original source document 10. In some embodiments, the visualization API 66 translates the layout metadata into a scalable vector graphics (SVG) description or using a PDF-oriented API; however, other visualization algorithms can be used.

An annotations overlayer 70 overlays at least the annotation of interest 60 on the generated rendering. Optionally, the annotations overlayer 70 also overlays other annotations such as annotations that are positionally nearby in the document layout, or all annotations in the document, or so forth. Before overlaying an annotation, an optional annotation offset calculator 72 may perform pre-processing to refine the position of the annotation in the rendering. The refinement can be computed, for example, based on geometrical properties encoded in the retrieval representation 64, in order to display the annotation on the right page and/or the right context zone. If no annotation offset calculator 72 is employed, then the annotation is rendered in conjunction with the sentence, paragraph, section, or other layout element identified by the positional tag as being associated with the annotation.

The annotations overlayer 70 renders the annotation or annotations in conjunction with the rendering of the retrieval content of the retrieval representation 64 with a layout based on the retrieval layout metadata of the retrieval representation 64 and the assigned positional tag of the annotation, along with any positional refinement computed by the optional annotation offset calculator 72. The annotation can be rendered, for example, by highlighting, underscoring, enclosing in a box, or otherwise marking the associated layout element and displaying the annotation in a suitable manner, such as in the margin of the page containing the associated layout element, or as a bubble that appears when a mouse pointer is hovered over the associated layout element, or so forth. In other annotation rendering approaches, a character string or a set of characters strings associated with the annotation are highlighted, underscored, or otherwise marked. The marked text can be localized by the annotations offset calculator 72 by matching string content of the annotation with corresponding string content in the associated layout element identified by the positional tag. In the case of image classification annotations, the classification of the image can be displayed in the margin of the image, or can pop up as a small read-only dialog window when a mouse pointer is hovered over the corresponding image.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A document annotator comprising:
a document converter configured to generate an initial representation of a source document, the initial representation including initial content of the source document and initial layout metadata indicative of layout of said content in the source document;

at least one annotation pipeline configured to process at least some of the initial content of the source document to generate document annotations;

a merger configured to assign positional tags of the initial layout metadata to the generated document annotations to locate the document annotations respective to the initial layout metadata;

catalog data storage configured to store at least the document annotations and their assigned positional tags; and a document visualizer implemented in software run via a processor that, subsequent to the storing:

generates a retrieval representation of the source document, the retrieval representation including retrieval content of the source document that is identical with the initial content and retrieval layout metadata that is identical with the initial layout metadata, the generating of the retrieval representation not comprising retrieving the initial representation of the source document, renders the retrieval content using the retrieval layout metadata, and renders at least one of the document annotations in conjunction with the rendering of the retrieval content based on the retrieval layout metadata and the assigned positional tag of the at least one document annotation.

2. The document annotator as set forth in claim 1, wherein the document converter is configured to generate the initial representation of the source document having an XML document format including the layout metadata.

3. The document annotator as set forth in claim 2, wherein the document converter is configured to receive the source document in at least one of HTML, PDF, and a native word processing application format.

4. The document annotator as set forth in claim 1, wherein the at least one annotation pipeline is configured to generate document annotations in conformance with a document ontology.

5. The document annotator as set forth in claim 4, wherein the document ontology includes annotations indicative of at least one of (i) the author of the source document; (ii) the title of the source document; and (iii) at least one topic or subject of the source document.

6. The document annotator as set forth in claim 1, wherein the content includes textual content, and the at least one annotation pipeline includes at least one semantic processing pipeline.

7. The document annotator as set forth in claim 1, wherein the content includes image content, and the at least one annotation pipeline includes at least one image classifier pipeline.

8. The document annotator as set forth in claim 1, wherein the at least one annotation pipeline includes at least one of:

an autonomous semantic annotation pipeline configured to autonomously generate semantic content annotations respective to received content, and an image annotation pipeline including an image classifier configured to generate an image annotation comprising an image classification.

9. The apparatus as set forth in claim 3, wherein:

the catalog data storage is configured to store the document annotations and their assigned positional tags and a pointer to the source document; and the generating of the retrieval representation of the source document performed by the document visualizer includes retrieving the source document using the stored pointer.

10. A document annotation method comprising:

generating an initial representation of a source document, the initial representation including initial content of the source document and initial layout metadata indicative of layout of said content in the source document;

processing at least some of the initial content of the source document to generate document annotations;

assigning positional tags of the initial layout metadata to the generated document annotations to locate the document annotations respective to the initial layout metadata;

storing at least the document annotations and their assigned positional tags;

subsequent to the storing, generating a retrieval representation of the source document, the retrieval representation including retrieval content of the source document that is identical with the initial content and retrieval layout metadata that is identical with the initial layout metadata, the generating of the retrieval representation not comprising retrieving the initial representation of the source document;

rendering the retrieval content using the retrieval layout metadata; and rendering at least one of the document annotations in conjunction with the rendering of the retrieval content based on the retrieval layout metadata and the assigned positional tag of the at least one document annotation.

11. The document annotation method as set forth in claim 10, wherein the generating an initial representation comprises:

generating an XML representation of the source document including the initial content of the source document and the initial layout metadata represented as metadata of the XML representation.

12. The document annotation method as set forth in claim 10, wherein the content includes image content, and the processing comprises:

performing image classification to generate image class document annotations.

13. The document annotation method as set forth in claim 10, wherein the content includes textual content, and the processing comprises:

performing semantic processing to generate semantic document annotations.

14. The document annotation method as set forth in claim 10, wherein the storing at least the document annotations and their assigned positional tags further includes:

storing the document annotations and their assigned positional tags and a pointer to the source document;

wherein the generating of the retrieval representation of the source document includes retrieving the source document using the stored pointer.

15. The document annotation method as set forth in claim 10, wherein the processing at least some of the initial content of the source document to generate document annotations includes at least one of:

autonomously generating semantic content annotations respective to received content, and applying an image classifier to an image of the initial content of the source document generate an image annotation for the image comprising an image classification.

16. An apparatus comprising:
a document converter configured to generate an initial representation of a source document, the initial representation including initial content of the source document and initial layout metadata indicative of layout of said content in the source document;
at least one annotation pipeline configured to process at least some of the initial content of the source document to generate document annotations;
a merger configured to assign positional tags of the initial layout metadata to the generated document annotations to locate the document annotations respective to the initial layout metadata;
catalog data storage configured to store at least the document annotations and their assigned positional tags; and
a document visualizer implemented in software run via a processor that, subsequent to the storing:
generates a retrieval representation of the source document, the retrieval representation including retrieval content of the source document that is identical with the initial content and retrieval layout metadata that is identical with the initial layout metadata,
renders the retrieval content using the retrieval layout metadata, and
renders at least one of the document annotations in conjunction with the rendering of the retrieval content based on the retrieval layout metadata and the assigned positional tag of the at least one document annotation.

17. The apparatus as set forth in claim 16, wherein the content includes image content, and the processing performed by the at least one annotation pipeline comprises:
performing image classification to generate image class document annotations.

18. The apparatus as set forth in claim 16, wherein the content includes textual content, and the processing performed by the at least one annotation pipeline comprises:
performing semantic processing to generate semantic document annotations.

19. The apparatus as set forth in claim 16, wherein the at least one annotation pipeline includes at least one of:
an autonomous semantic annotation pipeline configured to autonomously generate semantic content annotations respective to received content, and
an image annotation pipeline including an image classifier configured to generate an image annotation comprising an image classification.

20. The apparatus as set forth in claim 16, wherein the document converter is configured to generate the initial representation of the source document having an XML document format including the layout metadata.

21. The document annotator as set forth in claim 20, wherein the document converter is configured to receive the source document in at least one of HTML, PDF, and a native word processing application format.

* * * * *